(12) United States Patent
Suzuki et al.

(10) Patent No.: US 6,443,584 B2
(45) Date of Patent: Sep. 3, 2002

(54) SPREAD ILLUMINATING APPARATUS WITH MEANS FOR POSITIONING A BAR-LIKE LIGHT SOURCE

(75) Inventors: Shingo Suzuki; Koichi Toyoda, both of Iwata-gun (JP)

(73) Assignee: Minebea Co., Ltd., Kitasaku (JP)

( * ) Notice: Subject to any disclaimer, the term of this patent is extended or adjusted under 35 U.S.C. 154(b) by 0 days.

(21) Appl. No.: 09/769,472

(22) Filed: Jan. 26, 2001

(30) Foreign Application Priority Data

Feb. 8, 2000 (JP) ........................................ 2000-030538

(51) Int. Cl.[7] ................................................. F21V 7/04
(52) U.S. Cl. ........................ 362/31; 362/551; 362/223; 362/561
(58) Field of Search ........................... 362/31, 551, 223, 362/561

(56) References Cited

U.S. PATENT DOCUMENTS 6,286,970 B1 * 9/2001 Egawa et al. ................. 362/31

* cited by examiner

Primary Examiner—Sandra O'Shea
Assistant Examiner—Ronald E. DelGizzi
(74) Attorney, Agent, or Firm—Oliff & Berridge, PLC

(57) ABSTRACT

There is provided a spread illuminating apparatus in which transmission efficiency of light is enhanced and in which a good liquid crystal display screen is provided. Positioning means (25, 25) are provided on a lower plate inner surface (15) of a frame (13) that covers a light conductive member (3). The positioning means (25, 25) push up the light conductive member (3) relative to a transparent substrate (2) in the direction of the thickness of the light conductive member (3) (light source (5)) (toward an upper plate inner surface (14) of the frame) by the thickness t of a reflection preventive film (20) attached to the lower surface of the transparent substrate (2). Thus, an exit surface (9) of the light conductive member (3) does not overlap the reflection preventive film (20), and a good display can be realized on the liquid crystal screen. Further, the exit surface (9) of the light conductive member (3) and an incident surface (8) of the transparent substrate (2) can be fixedly held at the same height position, and thus light can be transmitted efficiently.

5 Claims, 5 Drawing Sheets

SPREAD ILLUMINATING APPARATUS WITH MEANS FOR POSITIONING A BAR-LIKE LIGHT SOURCE

BACKGROUND OF THE INVENTION

1. Field of the Invention

The present invention relates to a spread illuminating apparatus used as an illuminating means for signboards, various kinds of reflection-type display devices and the like, and more particularly, to a spread illuminating apparatus used as an illuminating means for a reflection-type liquid crystal display device.

2. Description of the Related Art

A liquid crystal display apparatus, which is characterized by being thin, small in occupied volume and lightweight, is used for many kinds of electric appliances such as a portable telephone, a personal computer or the like. Since a liquid crystal of the liquid crystal display device does not emit light by itself, when the liquid crystal display device is used in a dark place where sunlight or room light is not sufficiently available, a separate illuminating apparatus for lighting the liquid crystal is required besides the liquid crystal display device. Accordingly, it is desirable that such an illuminating apparatus is also small in size and low in power consumption. In order to attain this, light from the illuminating apparatus must be efficiently used. A conventional spread illuminating apparatus to answer such a demand is shown in FIG. 10 as an example.

As shown in the figure, a spread illuminating apparatus 1' generally comprises a transparent substrate 2 formed of a light-transmissible material and a light source 5 disposed close to an end surface 8 of the transparent substrate 2. The spread illuminating apparatus 1' makes light beams emitted from the light source 5 enter the transparent substrate 2 to light a liquid crystal display device (not shown in the figure) disposed under the transparent substrate 2.

The light source 5 comprises a long plate-like light conductive member 3 formed of a transparent material and a spot-like light source (for example, light emitting diode) 4 disposed at an end of the light conductive member 3 and mounted on a flexible printed circuit board 6. The light conductive member 3 is formed in a so-called wedge-shape, in which its thickness gradually decreases as it gets away from the spot-like light source 4. Further, the light conductive member 3 is provided with an optical path conversion means 12. The optical path conversion means 12 is formed on a surface opposite to a surface 9 facing the end surface 8 of the transparent substrate 2, and comprises grooves 10 triangular in section and plane portions 11 adjacent to the grooves 10. Light beams emitted from the spot-like light source 4 disposed at the end of the light conductive member 3 are adapted to enter substantially uniformly the end surface 8 of the transparent substrate 2 thanks to the wedge-shaped light conductive member 3 and the optical path conversion means 12. Note that the light conductive member 3 is disposed at a predetermined distance from the end surface 8 of the transparent substrate 2 in such a manner that the surface 9 of the light conductive member 3 is aligned to the end surface 8 of the transparent substrate 2.

A frame 13 is provided around the light conductive member 3 so that the light beams emitted from the spot-like light source 4 can enter efficiently the transparent substrate 2. The frame 13 is formed substantially in C-shape and covers longitudinal surfaces of the light conductive member 3 except the surface 9 facing the transparent substrate 2. The frame 13 is disposed in such a manner that a part of an upper plate inner surface 14 and a part of a lower plate inner surface 15 of the frame 13 overlap a part of the transparent substrate 2 at the end surface 8 side (see FIG. 12). A hard plastic to which a film evaporated with metal such as silver, a white-color film or the like is attached, or a bent metal plate such as an aluminum plate or a stainless plate is pasted on the sides of the frame 13 that face the light conductive member 3 (inner surfaces).

The transparent substrate 2 is formed in a so-called wedge-shape, in which its thickness gradually decreases as it gets away far from the end surface 8. Further, a light reflection pattern 19 is formed on an upper surface 16 of the transparent substrate 2. The light reflection pattern 19 comprises grooves 17 triangular in section and plane portions 18 adjacent to the grooves 17. Then, light beams coming from the light conductive member 3 are reflected uniformly on the whole surface of the transparent substrate 2 irrespective of the distance from the light conductive member 3 and illuminate the liquid crystal display device (not shown) disposed under the transparent substrate 2.

Moreover, a reflection preventive film 20 is attached to a lower surface of the transparent substrate 2. Even when light from the light source 5 is not used, that is, sunlight, room light or the like is used, the light does not cause diffused reflection inside the transparent substrate 2 because of the reflection preventive film 20, and illuminates the liquid crystal display device disposed under the transparent substrate 2. Thus, good images can be displayed on a liquid crystal screen.

By the way, in the spread illuminating apparatus 1' structured as described above, it is desirable that the areas of the opposing surfaces of the transparent substrate 2 and the light conductive member 3 are set equal to each other in order that the light beams emitted from the spot-like light source 4 are most efficiently transmitted into the transparent substrate 2. In other words, when the dimension of the end surface (incident surface) 8 of the transparent substrate 2 and the dimension of the surface (exit surface) 9 of the light conductive member 3 that faces the incident surface 8 are equal to each other, the light beams can be most efficiently transmitted from the exit surface 9 to the incident surface 8. However, because the reflection preventive film 20 is attached to the lower surface of the transparent substrate 2, when the dimension of the incident surface 8 and the dimension of the exit surface 9 are set equal to each other, the thickness of the transparent substrate 2 turns out to be larger than the thickness of the light conductive member 3 by the thickness t of the reflection preventive film 20 (see FIG. 11). In this state, if the light conductive member 3 and the transparent substrate 2 are simply set in the frame 13, the exit surface 9 shifts off (slides down) relative to the incident surface 8 by the thickness t of the reflection preventive film 20 as shown in FIG. 12. Therefore, it does not happen that light beams emitted from the exit surface 9 enter most efficiently the incident surface 8, and a part of the light beams emitted from the exit surface 9 enters the reflection preventive film 20. If the light beams enter the reflection preventive film 20, the end portion of the reflection preventive film 20 is reflected in the liquid crystal screen thereby generating an unevenness in brightness. Accordingly, in order to transmit light in the most efficient manner, the exit surface 9 and the incident surface 8 must face each other in an accurately matching position.

SUMMARY OF THE PRESENT INVENTION

The present invention has been made in view of the above, and an object of the present invention is therefore to provide a spread illuminating apparatus in which a light source (light conductive member) can be positioned accurately and easily in the thickness direction relative to a transparent substrate thereby presenting a good liquid crystal display.

In order to solve the above problem, according to a first aspect of the present invention, there is provided a spread illuminating apparatus comprising a bar-like light source disposed close to an end surface of a transparent substrate formed of a light-transmissible material, characterized in that a frame is provided in such a manner as to cover the bar-like light source and a portion of the transparent substrate to which the bar-like light source is disposed close, and that the frame is provided with a positioning means for determining the position of the bar-like light source relative to the transparent substrate in the thickness direction. According to the present invention, the end surface of the transparent substrate and the surface of the bar-like light source, which face each other, are disposed in such a manner that the surfaces oppose each other at a predetermined distance in an exactly matching position due to the positioning means. Thus, light is transmitted with a high efficiency.

Here, the positioning in the thickness direction refers to the positioning of the end surface of the transparent substrate and the surface of the bar-like light source, which face each other, in the short-side direction.

Further, in order to solve the above problem, according to a second aspect of the present invention, the spread illuminating apparatus is characterized in that bent springs are provided as the positioning means. The bent springs are disposed on an inner surface of the frame where the bar-like light source is to sit and the bar-like light source in the frame is pushed up in the thickness direction and fixedly positioned at a place where the surface of the bar-like light source coincides with the end surface of the transparent substrate, whereby the light from the light source is transmitted to the transparent substrate efficiently.

Moreover, in order to solve the above problem, according to a third aspect of the present invention, the spread illuminating apparatus is characterized in that wrinkles are provided as the positioning means. With the wrinkles provided as the positioning means, the surface of the bar-like light source and the end surface of the transparent substrate can coincide accurately with each other simply by setting the bar-like light source into the frame. Thus, the light from the light source can efficiently be transmitted to the transparent substrate.

In addition, in order to solve the above problem, according to a fourth aspect of the present invention, the spread illuminating apparatus of the present invention is characterized in that the frame is bent to have a step as the positioning means. Due to the step provided on the frame, the positional relationship between the bar-like light source and the transparent substrate both disposed in the frame is exactly determined.

Furthermore, in order to solve the above problem, according to a fifth aspect of the present invention, the spread illuminating apparatus is characterized in that a spacer is provided as the positioning means on an inner surface of the frame where the bar-like light source is to sit. The spacer can be with an arbitrary thickness, and due to the spacer the positional relationship between the bar-like light source and the transparent substrate is accurately determined.

PREFERRED EMBODIMENTS OF THE PRESENT INVENTION

Hereinafter, preferred embodiments of a spread illuminating apparatus according to the present invention will be described referring to the accompanying drawings.

It is to be noted that parts identical with or equivalent to those in the conventional art are designated by the same numerals and the detailed description thereof is omitted.

Figure 1:
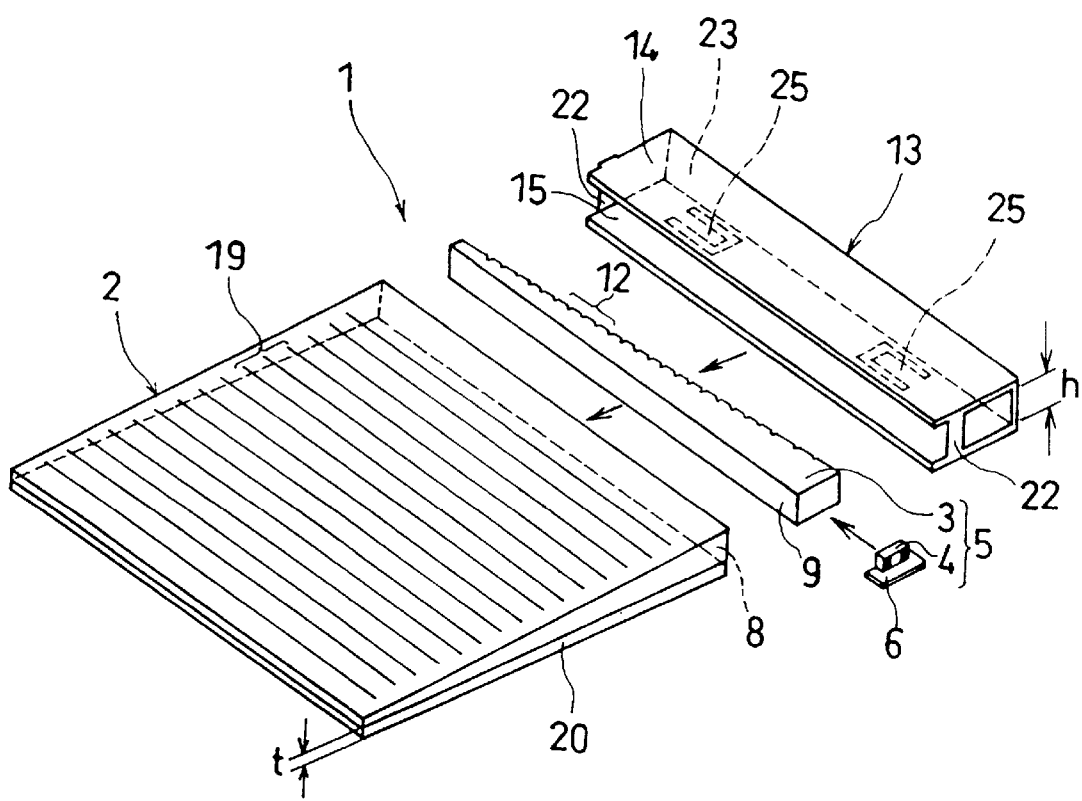
FIG. 1 is an exploded perspective view showing an embodiment of a spread illuminating apparatus according to the present invention.

FIG. 1 is a view showing an embodiment of a spread illuminating apparatus according to the present invention.

As shown in FIG. 1, a spread illuminating apparatus 1 is constituted by putting together a transparent substrate 2, a light source 5 comprising a light conductive member 3 and a spot-like light source (for example, a light emitting diode) 4, a frame 13 which covers the light conductive member 3, and a reflection preventive film 20 attached to the lower surface of the transparent substrate 2 (the respective components to be put together in accordance with the directions indicated by arrows in the figure).

The light conductive member 3 is formed in a so-called wedge-shape, in which the thickness thereof gradually decreases as it gets farther from the spot-like light source 4. Further, an optical path conversion means 12 is formed on a surface of the light conductive member 3. Such a structure enables light beams emitted from the spot-like light source 4 and entering the light conductive member 3 to be uniformly transmitted into the transparent substrate 2 irrespective of the distance from the spot-like light source 4. Further, the transparent substrate 2 is also formed in a so-called wedge-shape, in which the thickness thereof gradually decreases. A light reflection pattern 19, which reflects light beams emitted from the light conductive member 3 and made incident on the transparent substrate 2, is formed on the upper surface of the transparent substrate 2. In accordance with such structures, the light beams made incident on the transparent substrate 2 can illuminate a liquid crystal display apparatus (not shown) disposed under the transparent substrate 2 uniformly from the entire surface of the transparent substrate 2. In addition, the frame 13 is a metal plate processed by bending. A film evaporated with metal such as silver (not shown) is attached to the inner surface of the frame 13 in order to reflect efficiently light beams emitted from the light conductive member. The depth of the frame 13 that covers the light conductive member 3 is larger than the maximum width of the light conductive member 3 formed in a wedge-shape, and parts of an upper plate inner surface 14 and a lower plate inner surface 15 of the frame 13 are to cover the end portion of the transparent substrate 2 when the spread illuminating apparatus 1 is assembled.

Further, the frame 13 is provided with a claw 22 respectively at each of the longitudinal end of the frame 13. The claw 22 is a positioning means for determining the position of the light conductive member 3 relative to the transparent substrate 2 in the longitudinal direction, and is integrally formed with the frame 13. When the spread illuminating apparatus 1 is assembled, the claw 22 is positioned in such a manner as to partially overlap the transparent substrate 2.

An exit surface 9 of the light conductive member 3 and an incident surface 8 of the transparent substrate 2 are formed to have an equal area, and both the long sides and the short sides of the exit and incident surfaces are equal to each other in length, respectively. Therefore, when the exit surface 9 and the incident surface 8 are disposed in such a manner as to exactly overlap each other at a predetermined distance from each other, light can be most efficiently transmitted. Note that the dimension h (distance between the upper plate inner surface 14 and the lower plate inner surface 15) of the frame 13 is set to be equal to the dimension which includes the thickness of the reflection preventive film 20 in addition to the length of the short side of the incident surface 8 of the transparent substrate 2. Thus, the dimension h of the frame 13 is larger than the length of the short side of the exit surface 9 of the light conductive member 3 by the thickness of the reflection preventive film 20. Moreover, the lower plate inner surface 15 of the frame 13 is provided with positioning means 25 that shift the position of the light conductive member 3 disposed in the frame 13 by the thickness of the reflection preventive film 20 toward the upper plate inner surface 14 (direction of the light source thickness) when the spread illuminating apparatus 1 is assembled. The positioning means, embodiment of which is described hereinafter with reference to example, hold fixedly the exit surface 9 and the incident surface 8 at the same position in the direction of the light source thickness. Thus, light can be transmitted with the best efficiency.

Figure 2:
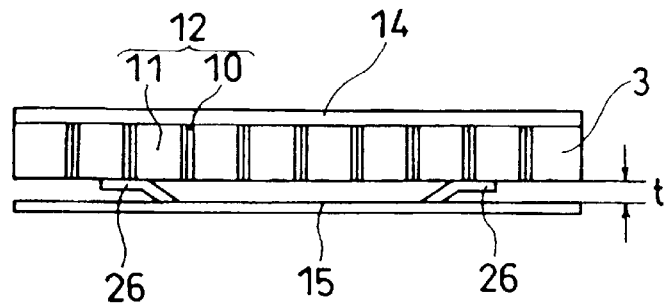
FIG. 2 is a view showing an example of a positioning means of the spread illuminating apparatus in FIG. 1.
Figure 3:
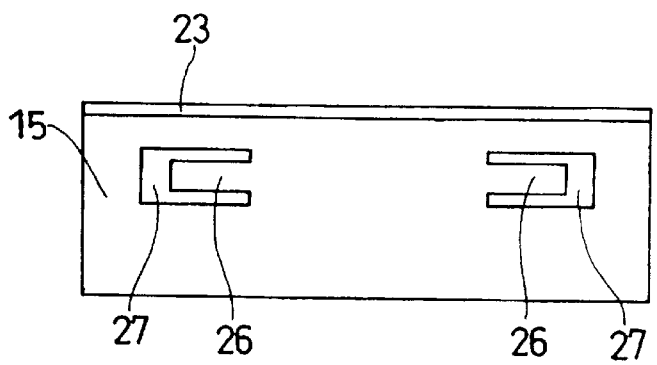
FIG. 3 is a top view of the positioning means in FIG. 2.
Figure 4:
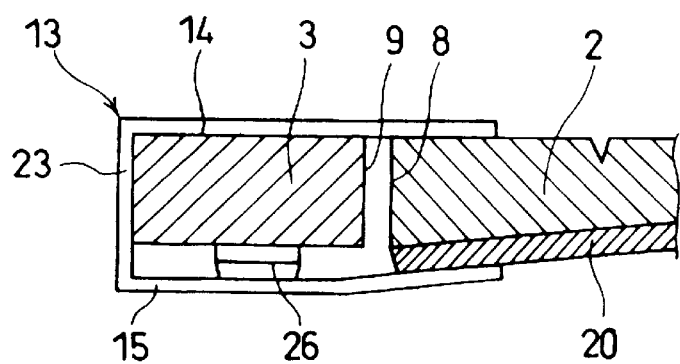
FIG. 4 is a view showing the positional relationship between a light conductive member and a transparent substrate, which is determined by the positioning means in FIG. 2.

FIGS. 2 to 4 show an example in which bent springs 26 are provided on the lower plate inner surface 15 of the frame 13 as the positioning means.

FIG. 2 shows the inside of the frame 13 of the spread illuminating apparatus 1 assembled as seen from the exit surface 9 of the light conductive member 3. A plurality of bent springs 26 (two in this case) are disposed on the lower plate inner surface 15 and push up the light conductive member 3 off the lower plate inner surface 15 toward the upper plate inner surface 14 by the thickness t of the reflection preventive film 20. FIG. 3 shows the lower plate inner surface 15 of the frame 13 as seen from the upper plate inner surface 14 side. A cut-away 27 is provided to form each of the bent springs 26. The bent springs 26 are provided at a position close to a back plate inner surface 23 of the frame 13 (to keep the bent springs 26 clear of the transparent substrate 2) in order to push up only the light conductive member 3 when the bent springs 26 are raised. The bent springs 26 can be regulated in bending height from the outside by pushing in using a tool such as a screwdriver after the spread illuminating apparatus 1 is assembled complete with the frame 13. FIG. 4 shows the positional relationship between the light conductive member 3 pushed up by the bent springs 26 and the transparent substrate 2. The light conductive member 3 pushed up by the bent springs 26 is shifted toward the upper plate inner surface 14 relative to the transparent substrate 2 by the thickness of the reflection preventive film 20 so that the exit surface 9 and the incident surface 8 overlap exactly each other.

Figure 5:
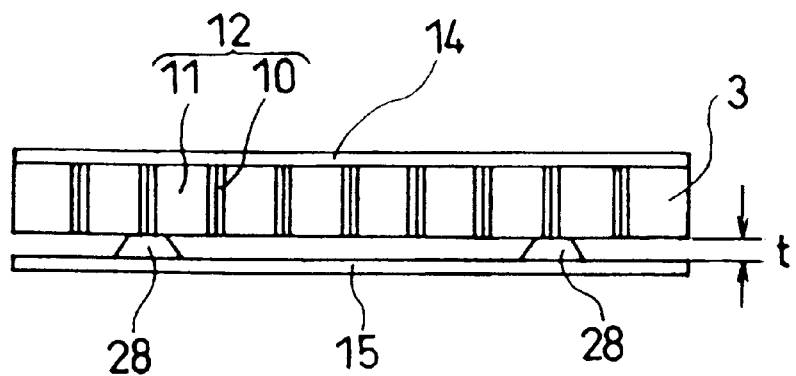
FIG. 5 is a view showing another example of the positioning means of the spread illuminating apparatus in FIG. 1.
Figure 6:
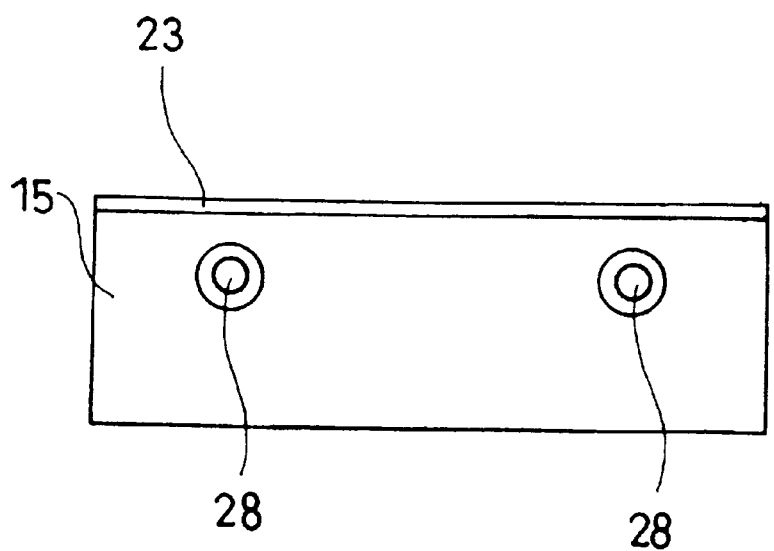
FIG. 6 is a top view of the positioning means in FIG. 5.

FIGS. 5 and 6 show an example in which protrusions (for example, wrinkles) 28 are provided on the lower plate inner surface 15 of the frame 13 as the positioning means.

A plurality of protrusions 28 (two in this case) are formed by a process called wrinkling when the frame 13 is produced. The height of the protrusions 28 is set to be equal to the thickness t of the reflection preventive film 20 so that when the light conductive member 3 is assembled in the frame 13, the protrusions 28 push up the light conductive member 3 off the lower plate inner surface 15 toward the upper plate inner surface 14 by the height of the wrinkles 28, that is, by the thickness t of the reflection preventive film 20. Thus, the exit surface 9 of the light conductive member 3 and the incident surface 8 of the transparent substrate 2 are fixedly held at the same position in the direction of the light source thickness, and therefore light can be transmitted with the best efficiency. The wrinkles 28 are disposed close to the back plate inner surface 23 of the frame 13 for the same reason as in case of the bent springs 26 (see FIG. 6).

Figure 7:
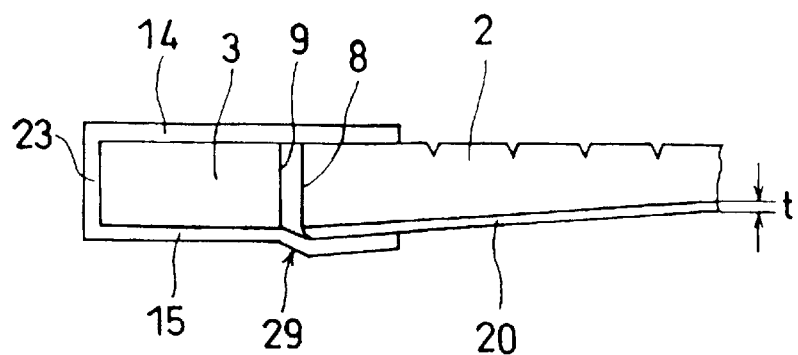
FIG. 7 is a view showing still another example of the positioning means of the spread illuminating apparatus in FIG. 1.

FIG. 7 shows an example in which a step 29 is provided on the lower plate inner surface 15 of the frame 13 as the positioning means.

The step 29 is formed on the lower plate inner surface 15 by bending the lower plate of the frame 13 at two places. The step 29 is formed during the process of bending the frame 13 in accordance with the size of the light conductive member 3, the thickness of the reflection preventive film 20, or the like. The height of the step 29 is made to be equal to the thickness t of the reflection preventive film 20. The light conductive member 3 is pushed up due to the step 29 toward the upper plate inner surface 14 relative to the transparent substrate 2. Thus, the exit surface 9 of the light conductive member 3 and the incident surface 8 of the transparent substrate 2 are fixedly held at the same position relative to the direction of the light source thickness, and therefore light can be transmitted with the best efficiency.

Figure 8:
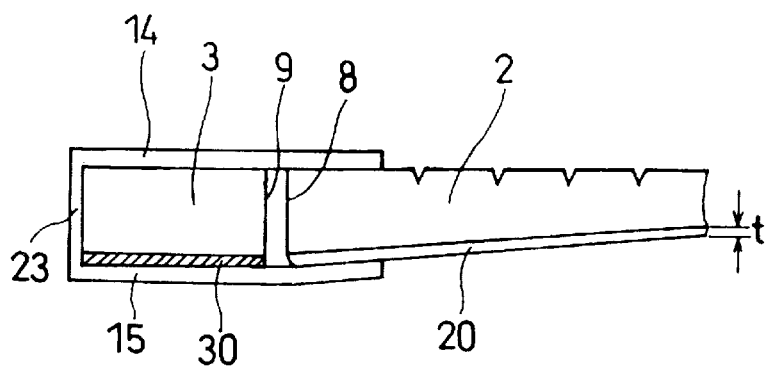
FIG. 8 is a view showing still another example of the positioning means of the spread illuminating apparatus in FIG. 1.
Figure 9:
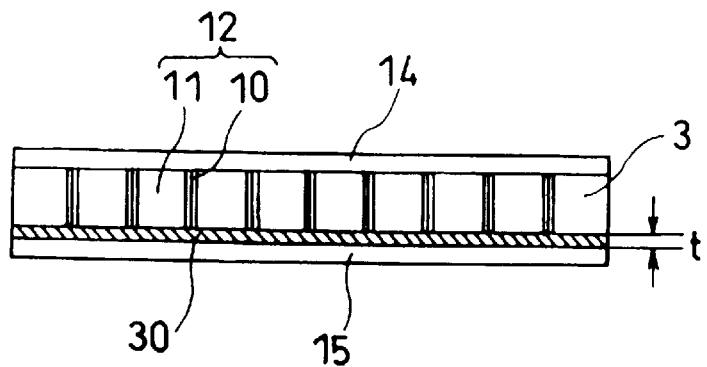
FIG. 9 is a view showing an arrangement of the positioning means in FIG. 8.
Figures 10, 11, 12:
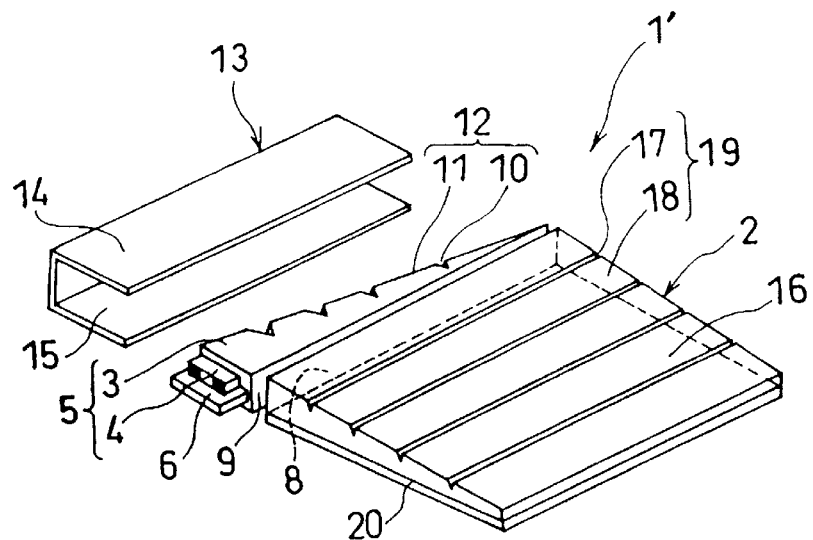
FIG. 10 is an exploded perspective view showing a conventional spread illuminating apparatus.
FIG. 11 is a view showing the difference in thickness between the light conductive member and the transparent substrate of the spread illuminating apparatus in FIG. 10.
FIG. 12 is a view showing the positional relationship between the light conductive member and the transparent substrate put together within a frame in FIG. 10.

FIGS. 8 and 9 show an example in which a spacer 30 is provided on the lower plate inner surface 15 of the frame 13 as the positioning means.

The spacer 30 has a thickness equal to the thickness t of the reflection preventive film 20. Thus, the light conductive member 3 is pushed up by the thickness of the spacer 30 relative to the transparent substrate 2, that is, by the thickness t of the reflection preventive film 20. Therefore, the exit surface 9 and the incident surface 8 are fixedly held at the same position in the direction of the light source thickness. Unlike the other positioning means described above, the frame 13 does not need any extra processing work in addition to the existing bending. The spacer 30 having the thickness t is adapted to cover the entire lower surface of the light conductive member 3 in this example, but it suffices if the light conductive member 3 is pushed up off the lower plate inner surface 15 by the thickness t of the reflection preventive film 20. Accordingly, provision of a plurality of small spacers will serve the purpose.

From the above, the spread illuminating apparatus of the present invention ensures that the bar-like light source can be properly positioned relative to the transparent substrate in the direction of their thickness. Further, when the positioning means is formed on the frame in advance, the number of components can be prevented from increasing, and also the spread illuminating apparatus can be easily assembled. When the positioning means such as a spacer is attached to the frame, the existing frame can be used as it is since there is no need to additionally process the frame. Thus, the increase in cost can be suppressed. Furthermore, the exit surface of the light conductive member constituting the light source and the incident surface of the transparent substrate may be fixedly held at the same position in the direction of the light source thickness. Thus, the exit surface of the light conductive member does not overlap any portion of the reflection preventive film that is attached to the lower surface of the transparent substrate. Therefore, a defect that the end portion of the reflection preventive film is reflected in the liquid crystal display screen, which leads to unevenness in brightness on the screen, can be prevented.

What is claimed is:

1. A spread illuminating apparatus, comprising:

a bar-like light source composed of a spot-like light source and a light conductive member, disposed close to an end surface of a transparent substrate formed of a light-transmissible material, a reflection preventive film attached to a lower surface of said transparent substrate, and a frame provided in such a manner as to cover said bar-like light source and a portion of said transparent substrate provided close to said bar-like source, wherein an exit surface of said light conductive member and an incident surface of said transparent substrate are equal to each other in length of their short sides, and said frame is provided with a positioning means on a lower inner surface of the frame, for determining the position of said bar-like light source relative to said transparent substrate in the direction of its thickness.

2. The spread illuminating apparatus as claimed in claim 1, wherein bent springs are provided as said positioning means.

3. The spread illuminating apparatus as claimed in claim 1, wherein wrinkles are provided as said positioning means.

4. The spread illuminating apparatus as claimed in claim 1, wherein a step formed by bending said frame is provided as said positioning means.

5. The spread illuminating apparatus as claimed in claim 1, wherein a spacer is provided on a lower plate inner surface of said frame as said positioning means.

* * * * *